(12) United States Patent
Klein et al.

(10) Patent No.: US 10,140,758 B1
(45) Date of Patent: *Nov. 27, 2018

(54) TEXTURING MODELS OF STRUCTURES

(71) Applicant: The Boeing Company, Chicago, IL (US)

(72) Inventors: Robert J. Klein, Ballwin, MO (US); David Alan Findley, Florissant, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,542

(22) Filed: Oct. 5, 2015

Related U.S. Application Data

(63) Continuation-in-part of application No. 13/928,980, filed on Jun. 27, 2013, now Pat. No. 9,349,211.

(51) Int. Cl.
*G06T 17/05* (2011.01)
*G06T 15/04* (2011.01)
*G06T 11/00* (2006.01)

(52) U.S. Cl.
CPC ............ *G06T 17/05* (2013.01); *G06T 11/001* (2013.01); *G06T 15/04* (2013.01); *G06T 2215/12* (2013.01)

(58) Field of Classification Search
CPC ......... G06T 17/05; G06T 19/00; G06T 17/00; G06T 17/20
USPC ........................................................ 345/419
See application file for complete search history.

(56) References Cited

U.S. PATENT DOCUMENTS

| 5,001,348 | A | * | 3/1991 | Dirscherl | ................ | G01S 3/784 |
| | | | | | | 250/339.05 |
| 6,073,115 | A | * | 6/2000 | Marshall | ............. | G06F 3/04815 |
| | | | | | | 345/419 |
| 7,068,816 | B1 | | 6/2006 | Knoblauch et al. | | |
| 2003/0074099 | A1 | | 4/2003 | Yan | | |
| 2003/0164838 | A1 | | 9/2003 | Guo et al. | | |
| 2005/0065843 | A1 | * | 3/2005 | Carlock | ............. | G06Q 30/0241 |
| | | | | | | 705/14.4 |
| 2007/0109310 | A1 | | 5/2007 | Xu et al. | | |
| 2008/0062198 | A1 | * | 3/2008 | Takahashi | ............... | A63F 13/63 |
| | | | | | | 345/630 |

(Continued)

OTHER PUBLICATIONS

Christian Frueh, Automated Texture Mapping of 3D City Models With Oblique Aerial Imagery, Proceedings of the 2nd International Symposium on 3D Data Processing, Visualization, and Transmission (3DPVT'04) 0-7695-2223-8/04, Sep. 2004, pp. 396-403.*

(Continued)

*Primary Examiner* — Hai Tao Sun
(74) *Attorney, Agent, or Firm* — Yee & Associates, P.C.

(57) ABSTRACT

A method and apparatus is provided for forming a model of a structure. Input data comprising a set of values for a set of attributes is received. The set of values for the set of attributes is matched to a number of texture decks in a plurality of texture decks. A texture deck in the plurality of texture decks is associated with a set of assigned attributes. Each assigned attribute in the set of assigned attributes is assigned at least one assigned value. A texture deck from the number of texture decks is selected as a final texture deck for use in forming the model of the structure.

19 Claims, 10 Drawing Sheets

(56) References Cited

U.S. PATENT DOCUMENTS

| | | | |
|---|---|---|---|
| 2008/0221843 A1* | 9/2008 | Shenkar | G06T 17/05 703/1 |
| 2009/0141020 A1* | 6/2009 | Freund | G06T 11/001 345/419 |
| 2010/0202682 A1 | 8/2010 | Lieckfeldt | |
| 2013/0222369 A1 | 8/2013 | Huston et al. | |

OTHER PUBLICATIONS

Klein et al., "Texturing Models of Structures," U.S. Appl. No. 13/928,980, filed Jun. 27, 2013, 51 pages.

Office Action, dated Apr. 3, 2015, regarding U.S. Appl. No. 13/928,980, 27 pages.

Final Office Action, dated Jul. 16, 2015, regarding U.S. Appl. No. 13/928,980, 33 pages.

"LiDAR Analyst Customer Support Tips—3D Building Extraction," Visual Learning Systems, Inc., copyright 2007, 3 pages, accessed Jun. 27, 2013. http://www.featureanalyst.com/lidar_analyst/support/tips/3d_buildings.htm.

Frueh et al., "Automated Texture Mapping of 3D City Models With Oblique Aerial Imagery," Proceedings of the 2nd International Symposium on 3D Data Processing, Visualization and Transmission, Sep. 2004, pp. 396-403.

Hu et al., "Building Modeling from LiDAR and Aerial Imagery," American Society for Photogrammetry and Remote Sensing (ASPRS), vol. 4, May 2004, pp. 23-28.

Oda et al., "Automatic Building Extraction and 3-D City Modeling from LiDAR Data Based on Hough Transformation," International Society for Photogrammetry and Remote Sending (ISPRS), Commission III, vol. XXXV, Part B3, Jul. 2004, pp. 277-280.

\* cited by examiner

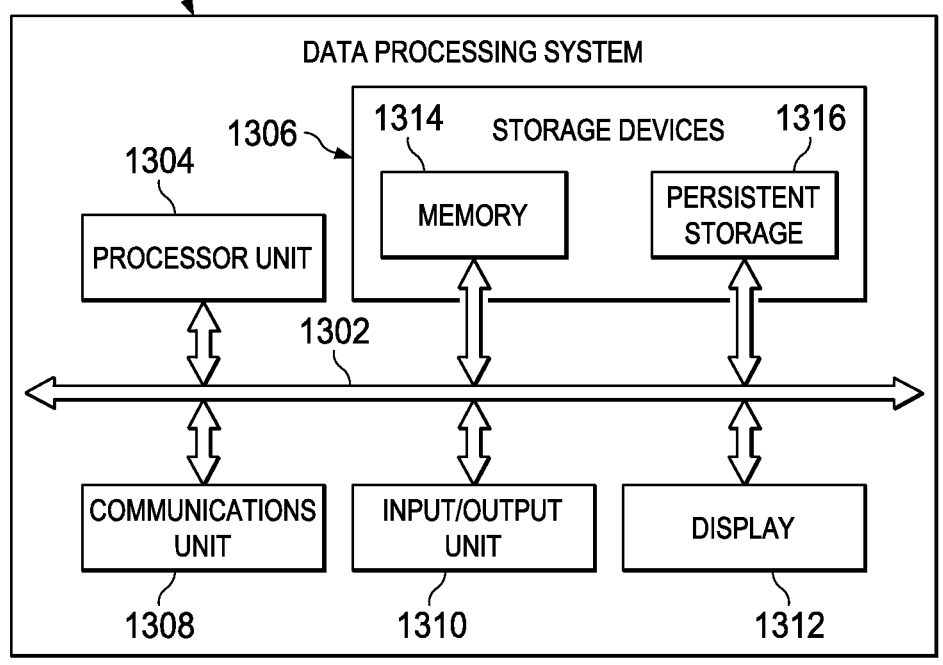
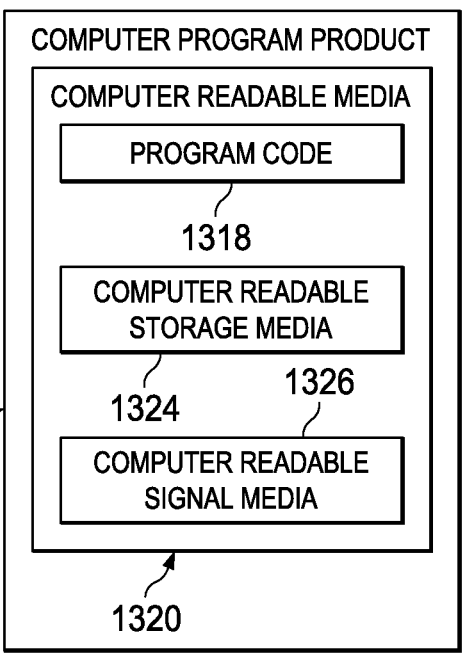
FIG. 13

TEXTURING MODELS OF STRUCTURES

CROSS-REFERENCE TO RELATED APPLICATION

This application is a continuation of and claims the benefit of priority to U.S. patent application Ser. No. 13/928,980, filed on Jun. 27, 2013, now U.S. Pat. No. 9,349,211, entitled "Texturing Models of Structures", the contents of which are incorporated herein by reference.

BACKGROUND INFORMATION

1. Field

The present disclosure relates generally to creating models of structures and, in particular, to applying textures to models of structures. Still more particularly, the present disclosure relates to a method and apparatus for creating models of structures with a desired level of realism using geospatial data and different types of textures.

2. Background

Increasingly, different types of visual simulation systems are using two-dimensional geospatial data and three-dimensional geospatial data to simulate different types of environments. As used herein, "geospatial data" may identify the geographic location and characteristics of natural or constructed features and boundaries on the earth. These features and/or boundaries are typically represented by points, lines, polygons, and/or complex geometric features. Geospatial data may include original and/or interpreted geospatial data derived through, for example, without limitation, remote sensing, images, aerial photographs, raster data sets, and/or other forms of data and/or data sets. Further, geospatial data may be in digitized or non-digitized form.

Using geospatial data to visually simulate environments such as, for example, urban environments, rural environments, industrial environments, and/or other types of environments, may improve the realism of these visual simulations. However, some currently available visual simulation systems use geospatial data having different formats and/or process the geospatial data to form simulation data having different formats. Consequently, correlating between the simulated environments generated by these different types of visual simulation systems may be more difficult than desired.

Further, some currently available visual simulation systems may be unable to visually simulate structures as realistically as desired. For example, these visual simulation systems may be unable to visually simulate structures, such as, but not limited to, buildings, apartment complexes, bridges, factories, towers, and/or other types of structures, as realistically as desired. In particular, these visual simulation systems may be unable to visually simulate the texture of a building as realistically and/or as accurately as desired. For example, the visual simulation systems may be unable to simulate the brick texture or stone texture of a building, or, in some cases, the architectural features of the roof of a building.

Additionally, some currently available visual simulation systems may be unable to process extensive amounts of two-dimensional geospatial data as quickly as desired. In other words, these visual simulation systems may not be as efficient as desired. In particular, portions of the process of generating visual simulations based on geospatial data may need to be manually performed by a human operator. More specifically, decisions regarding the manner in which certain features of structures are visually simulated may need to be made by a human operator.

Consequently, this type of process may take more time than is available for a human operator. For example, a portion of a city may need to be visually simulated. This portion of the city may include over 500 buildings and/or other types of structures, each having at least one distinct feature, that need to be visually simulated. With currently available visual simulation systems, processing geospatial data for this portion of the city to visually simulate the portion of the city may take one human operator about four to five days to complete. It may be desirable to have a visual simulation system capable of reducing the time needed to visually simulate the portion of the city to less than a day, or even a few hours.

In some cases, the process of visually simulating a geographic area may require an operator having a certain level of expertise and/or skill and/or having detailed knowledge of the types of structures and features that may be native to this particular geographic area. However, a single human operator may not have the desired level of expertise, skill, and/or knowledge about the different types of structures indigenous to different parts of the world.

In still other examples, some currently available visual simulation systems do not easily provide a capability to generate certain features of structures that are realistic and representative of the types of structures and features that are indigenous to a particular geographic area being identified and depicted by the geospatial data. Therefore, it would be desirable to have a method and apparatus that take into account at least some of the issues discussed above, as well as other possible issues.

SUMMARY

In one illustrative example, an apparatus comprises a texture library and a texture manager. The texture library comprises a plurality of texture decks. The texture manager is configured to receive input data comprising a set of values for a set of attributes. The texture manager is further configured to match the set of values for the set of attributes to a number of texture decks from the plurality of texture decks. The texture manager is still further configured to select a texture deck from the number of texture decks as a final texture deck for use in forming a model of a structure.

In another illustrative example, a visual simulation system comprises a texture library, a texture manager, and a model manager. The texture library comprises a plurality of texture decks. A texture deck in the plurality of texture decks is associated with a set of assigned attributes. Each assigned attribute in the set of assigned attributes is associated with at least one assigned value. The texture manager is configured to receive input data comprising a set of values for a set of attributes. The texture manager is further configured to match the set of values for the set of attributes to a number of texture decks from the plurality of texture decks. The texture manager is still further configured to select a texture deck from the number of texture decks as a final texture deck for use in forming a number of models of a number of structures. A model manager is configured to identify a geometric shape for use in forming a model of a structure. The model manager is further configured to texturize each of a number of sides of the geometric shape using the final texture deck to form the model of the structure.

In yet another illustrative example, a method for forming a model of a structure is provided. Input data comprising a set of values for a set of attributes is received. The set of values for the set of attributes is matched to a number of texture decks in a plurality of texture decks. A texture deck in the plurality of texture decks is associated with a set of assigned attributes. Each assigned attribute in the set of assigned attributes is assigned at least one assigned value. A texture deck from the number of texture decks is selected as a final texture deck for use in forming the model of the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a data processing system in the form of a block diagram in accordance with an illustrative embodiment.

DETAILED DESCRIPTION

Figure 1:
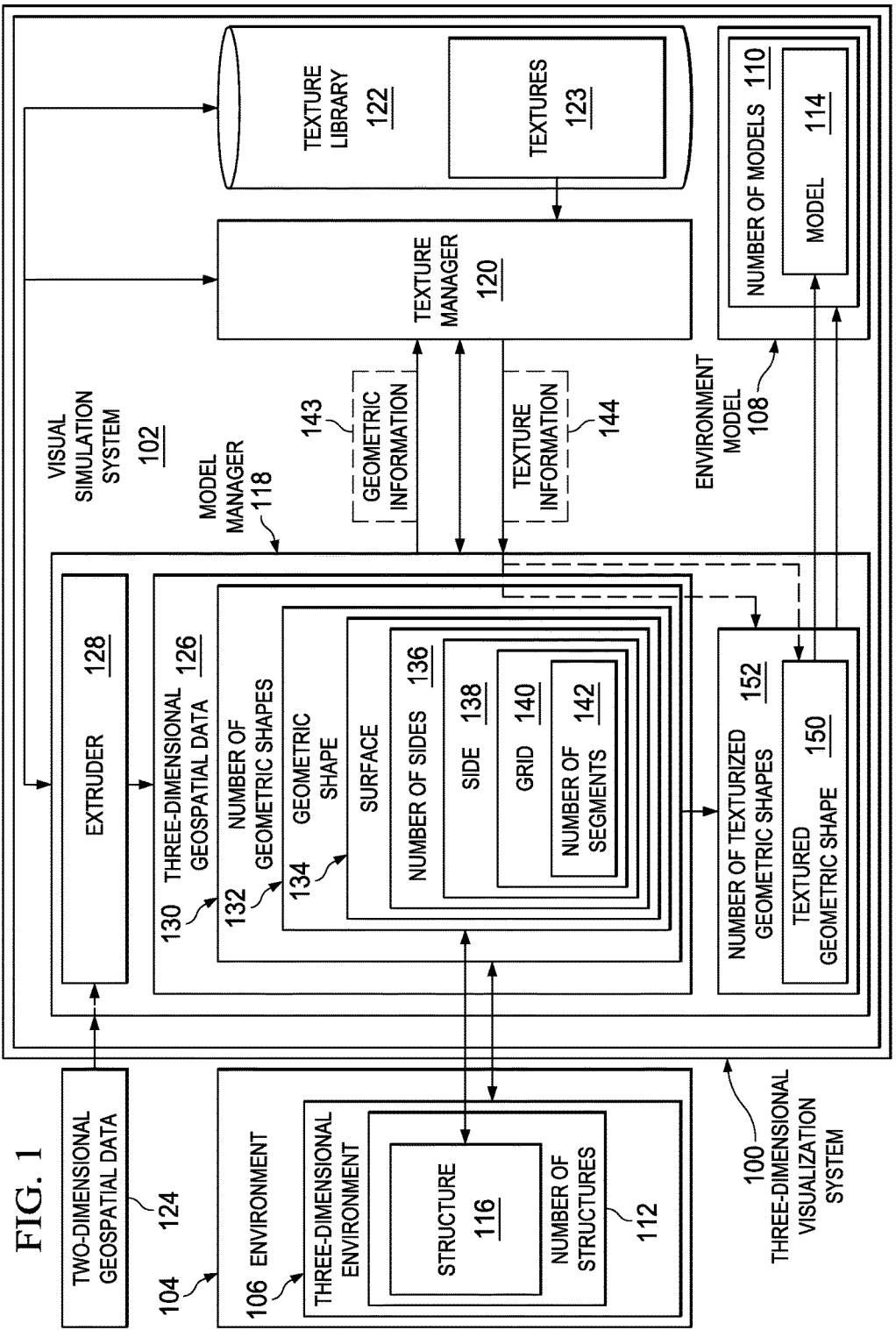
FIG. 1 is an illustration of a three-dimensional visualization system in the form of a block diagram in accordance with an illustrative embodiment.

The illustrative embodiments recognize and take into account different considerations. For example, the illustrative embodiments recognize and take into account that it may be desirable to have a visual simulation system that can visually simulate an environment in an automated manner without requiring user input. This visual simulation system may also be referred to as a geospatial simulation generation system. The illustrative embodiments also recognize and take into account that it may be desirable to have a visual simulation system that can visually simulate an environment with a desired level of realism quickly and efficiently using textures.

For example, the illustrative embodiments recognize and take into account that it may be desirable to enable a geospatial simulation generation system to include information representative of many different types of structures and features that are indigenous to different parts of the world. In this manner, a human operator using the visual simulation system to visually simulate different geographic areas in the world may not be required to have knowledge of the different types of structures and features indigenous to these different parts of the world.

Thus, the illustrative embodiments provide a method, apparatus, and system for visually presenting a three-dimensional environment. In one illustrative example, a three-dimensional visualization system may be used to form an environment model of the three-dimensional environment using models of various structures within the three-dimensional environment. The models of these structures may be formed such that the models may be displayed in a manner that visually simulates the structures with a desired level of realism.

For example, the three-dimensional visualization system may include a texture library, a texture manager, and a model manager. The model manager may identify a number of geometric shapes for use in forming a number of models for a number of structures that may be present in a three-dimensional environment. The model manager may use a texture library to texturize the number of geometric shapes in an automated manner.

The texture library may comprise a plurality of texture decks in which a texture deck in the plurality of texture decks may be associated with a set of assigned attributes. Further, each assigned attribute in the set of assigned attributes may be associated with at least one assigned value. The texture manager may receive input data comprising a set of values for a set of attributes and then match the set of values for the set of attributes to a number of texture decks from the plurality of texture decks. Thereafter, the texture manager may select a texture deck from the number of texture decks as a final texture deck for use in forming the number of models of the number of structures.

Further, the model manager may texturize a number of sides of each of the number of geometric shapes to form the number of models of the number of structures using the textures in the final texture deck. The textures may be selected randomly and/or based on a policy, depending on the implementation.

Referring now to the figures and, in particular, with reference to FIG. 1, an illustration of a three-dimensional visualization system is depicted in the form of a block diagram in accordance with an illustrative embodiment. In this illustrative example, three-dimensional visualization system 100 may be used to visually present environment 104.

Environment 104 may be a three-dimensional environment 106 in this example. Environment 104 may be, for example, an existing geographic region, an imaginary geographic region, a city, a neighborhood, an area in a town, or some other type of environment.

As depicted, number of structures 112 may be present within environment 104. As used herein, a "number of" items may be one or more items. In this manner, number of structures 112 may include one or more structures. Structure 116 may be an example of one of number of structures 112. Structure 116 may take a number of different forms. In this illustrative example, structure 116 may be a manmade or constructed structure. For example, structure 116 may take the form of a building, a tower, a bridge, a dam, a lighthouse, a factory, a manufacturing plant, a house, or some other type of structure.

Three-dimensional visualization system 100 may be implemented using hardware, software, or a combination of the two. For example, three-dimensional visualization system 100 may be implemented using a computer system comprised of one or more computers. When more than one computer is present in the computer system, these computers may be in communication with each other.

In one illustrative example, three-dimensional visualization system 100 may take the form of visual simulation system 102. Visual simulation system 102 may visually present environment 104 by creating a visual simulation of environment 104. In particular, visual simulation system 102 may create environment model 108 to simulate environment 104. Environment model 108 may be, for example, without limitation, a computer-aided design model or some other type of computer model.

As depicted, environment model 108 may be formed using number of models 110 of number of structures 112. In this illustrative example, number of models 110 may include a model for each structure in number of structures 112. For example, model 114 in number of models 110 may be a model of structure 116.

As depicted, visual simulation system 102 includes model manager 118, texture manager 120, and texture library 122. Each of model manager 118, texture manager 120, and texture library 122 may be implemented using hardware, software, or a combination of the two.

Model manager 118 may be configured to form and manage number of models 110. Texture manager 120 may be configured to apply one or more of textures 123 stored in texture library 122 to each of number of models 110. Texture library 122 may be implemented using, for example, without limitation, a number of databases, a number of files, a number of image databases, and/or a number of other types of data structures. In one illustrative example, each of textures 123 may be an image of a texture that could potentially be present on one of number of structures 112. Texture library 122 and textures 123 are described in greater detail in FIG. 2 below.

In this illustrative example, model manager 118 may use two-dimensional geospatial data 124 about environment 104 to form three-dimensional geospatial data 126 for environment 104. Two-dimensional geospatial data 124 about environment 104 may be received from any number of sources, depending on the implementation. Two-dimensional geospatial data 124 may identify the locations, boundaries, and/or other characteristics of number of structures 112. The boundaries may be represented by points, lines, polygons, and/or other types of geometric features.

Two-dimensional geospatial data 124 may be received in the form of images in which number of structures 112 have been outlined, aerial photographs in which number of structures 112 have been outlined, raster data sets, and/or other forms of data and/or data sets. In some cases, two-dimensional geospatial data 124 may take the form of two-dimensional vector data. Further, two-dimensional geospatial data 124 may have been generated using images such as, for example, without limitation, satellite images, radar images, light detection and ranging images, laser detection and ranging images, and/or other types of images.

Extruder 128 in model manager 118 may be used to extrude three-dimensional geospatial data 126 based on two-dimensional geospatial data 124. For example, extruder 128 may use two-dimensional geospatial data 124 and height information about number of structures 112 to generate three-dimensional geospatial data 124.

Three-dimensional geospatial data 126 may include, for example, without limitation, number of geometric shapes 130 for number of structures 112. Geometric shape 132 may be an example of one of number of geometric shapes 130. Geometric shape 132 may be a geometric representation of the shape of structure 116. For example, geometric shape 132 may be a polyhedron such as, but not limited to, a cube, a hexahedron, a tetrahedron, a prism, a pentagonal prism, or some other type of polyhedron.

Model manager 118 may be configured to texturize each of number of geometric shapes 130 using textures 123 stored in texture library 122. As one illustrative example, model manager 118 may identify that geometric shape 132 has surface 134 formed by the different sides of geometric shape 132. Model manager 118 may use textures 123 to texturize number of sides 136 of geometric shape 132. In particular, model manager 118 may use texture manager 120 to apply texture to surface 134 of geometric shape 132 at each of number of sides 136.

In this illustrative example, model manager 118 may divide each of number of sides 136 into segments and then apply texture to each segment. For example, side 138 may be one of number of sides 136. Model manager 118 may divide side 138 into number of segments 142. In some cases, number of segments 142 may form grid 140. The segment sizing used to divide side 138 into number of segments 142 may be preselected by model manager 118. In some cases, segments at one or more edges of side 138 may be smaller than the other segments.

Model manager 118 may send information about each of number of sides 136 and the number of segments identified for each of number of sides 136 to texture manager 120 in the form of geometric information 143. Texture manager 120 may use geometric information 143 and texture library 122 to generate texture information 144.

Texture information 144 may include a selection of a texture from textures 123 in texture library 122 for each segment in the number of segments identified for each side in number of sides 136. Texture manager 120 may send texture information 144 to model manager 118. Model manager 118 may use texture information 144 to texturize geometric shape 132 to form texturized geometric shape 150. This entire process may then be repeated for each geometric shape in number of geometric shapes 130 to form number of texturized geometric shapes 152.

Model manager 118 may use number of texturized geometric shapes 152 to form environment model 108 of environment 104. In particular, environment model 108 may be used to visually simulate environment 104 with a desired level of realism. The manner in which number of geometric shapes 130 may be texturized to form number of texturized geometric shapes 152 is described in greater detail in FIG. 2 below.

Figure 2:
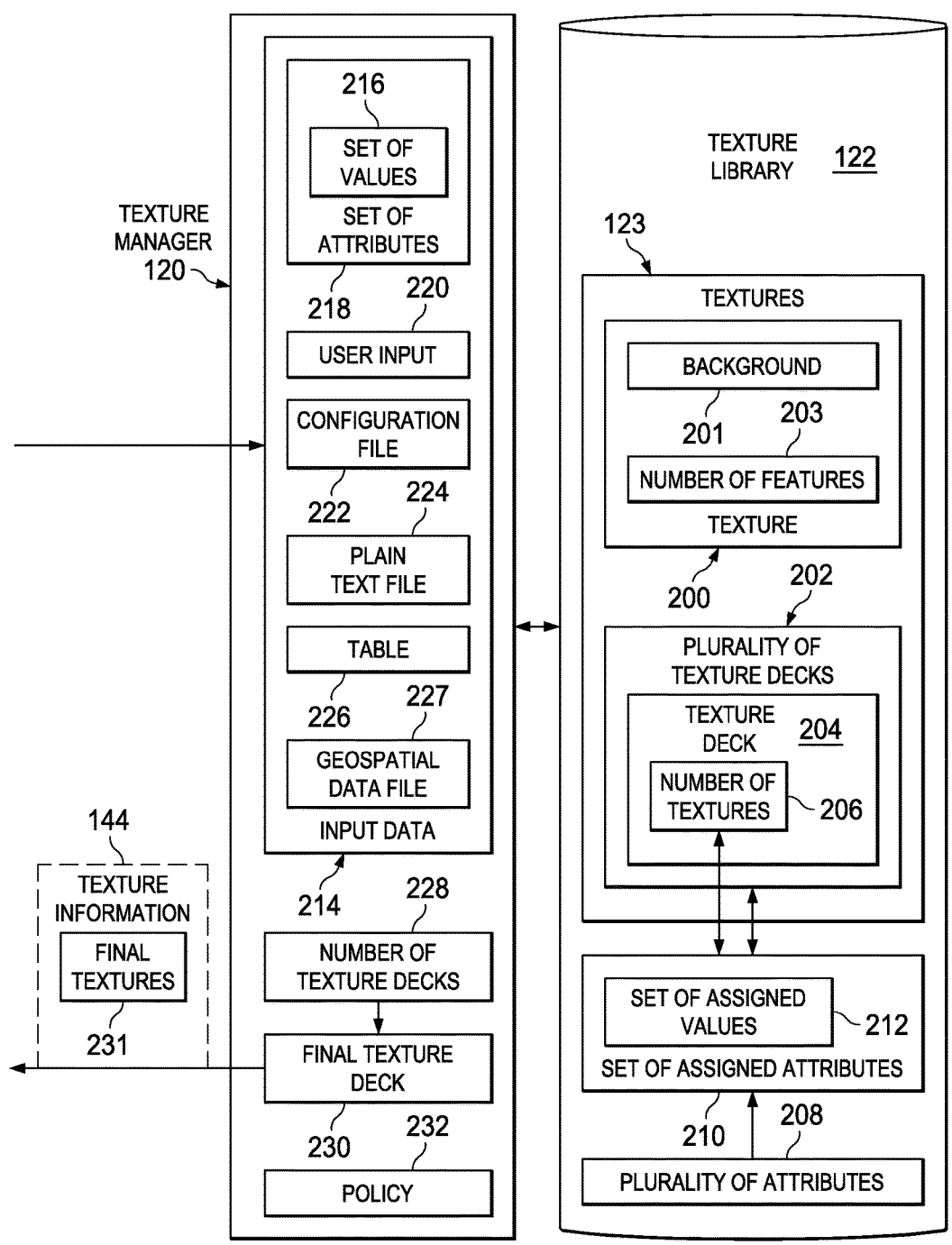
FIG. 2 is an illustration of a texture manager and a texture library in the form of a block diagram in accordance with an illustrative embodiment.

With reference now to FIG. 2, an illustration of texture manager 120 and texture library 122 from FIG. 1 is depicted in the form of a block diagram in accordance with an illustrative embodiment. Textures 123 in texture library 122 may take a number of different forms. Texture 200 may be an example of one of textures 123. In this illustrative example, texture 200 may include background 201 and, in some cases, number of features 203. In this manner, number of features 203 may or may not be included in texture 200.

Background 201 may be the portion of texture 200 that represents a surface or surface texture of a structure. For example, background 201 may be selected from one of a brick background, a concrete background, a stone background, a slab background, a stucco background, a wood paneling background, a glass background, a metal background, some other type of background, or some combination of these backgrounds.

Number of features 203 may be, for example, without limitation, architectural features that are visible at the surface of a structure. Number of features 203 may include at least one of a window, a door, a railing, a balcony, a gable, or some other type of architectural feature.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Textures 123 in texture library 122 may be organized into plurality of texture decks 202. As used herein, a "texture deck" may be a collection of one or more textures. Texture deck 204 may be an example of one of plurality of texture decks 202. Texture deck 204 may include, for example, number of textures 206.

As depicted, plurality of attributes 208 may be associated with plurality of texture decks 202. An "attribute," as used herein, may be a category of features that may be associated with a texture. For example, an attribute in plurality of attributes 208 may be selected from one of a region, a subregion, a structure type, a building material, an architectural feature, a sensor type, or some other type of attribute.

The region and subregion attributes may allow a particular geographic region and geographic subregion, respectively, in the world to be identified. The region and subregion attributes may enable automated application of features and textures that represent those used by structures native to the respective geographic region and geographic subregion of interest. So, in cases where representative imagery may not be available, a visual simulation of a geographic area can be created that is more representative of a likely real-world geographic area or environment than would otherwise be possible with prior visualization systems.

In this illustrative example, each texture deck in plurality of texture decks 202 may be associated with a particular set of attributes in plurality of attributes 208. In one illustrative example, one or more of plurality of attributes 208 may be assigned to texture deck 204 to form set of assigned attributes 210 for texture deck 204. As used herein, a "set of" items may include one or more items. In this manner, set of assigned attributes 210 may be one or more attributes.

Further, texture deck 204 may be associated with set of assigned values 212 for each assigned attribute in set of assigned attributes 210. In this manner, each texture deck in plurality of texture decks 202 may be associated with a set of assigned attributes. Further, each assigned attribute in this set of assigned attributes may be associated with at least one assigned value.

As used herein, a "value" may take a number of different forms. For example, an attribute may be a structure type and a value for the structure type may be selected from one of a building, a tower, a factory, a manufacturing plant, a residential dwelling, an apartment complex, a commercial building, and/or some other specific structure type. In another example, when the attribute is a sensor type, a value for the sensor type may be selected from one of an infrared sensor, an ultraviolet sensor, an electro-optical sensor, a radar system, a nighttime sensor, a classified sensor, a daytime sensor, a thermal imaging device, and/or some other type of sensor.

In one illustrative example, number of textures 206 in texture deck 204 may all share the same background, which may be a brick background. However, each texture in number of textures 206 may have different features. For example, one texture may be a brick background with a single window, while another texture may be a brick background with a window and a door. Yet another texture may be a brick background with two windows and two doors.

Set of assigned attributes 210 for texture deck 204 may include region, subregion, and building type. North America, North or Sub-Sahara Africa, Asia, and Europe, among many regions and subregions, may be assigned as values for the region attribute associated with texture deck 204. In this manner, number of textures 206 in texture deck 204 may be used for structures that are located within North America, Asia, Africa, Europe, and other parts of the world.

Further, urban, rural, desert, mountain, and other types of subregions may be assigned as a value to the subregion attribute associated with texture deck 204. In this manner, number of textures 206 may be more specifically used for structures located within urban areas in North America and Europe. In other circumstances, number of textures 206 and other features indigenous to other parts of the world may be available for selection, identification, and use in generating a more representative visual simulation of a particular geographic region or subregion of interest. In this way, such visual simulations can create representative environments without detailed imagery or personal knowledge of the types of structures, textures, and features actually in use and found in a particular geographic region of interest.

Still further, apartment complex, house, office building, and/or other values for structures indigenous to other parts of the world may be assigned as values for the building type attribute associated with texture deck 204. In this manner, number of textures 206 may be more specifically used to texturize the geometric shape identified for the model of any structure that is either an apartment complex, a house, or an office building located with an urban area in North America or Europe.

Texture manager 120 may be configured to receive input data 214. Input data 214 may include an identification of set of values 216 for set of attributes 218. Depending on the implementation, input data 214 may be received in the form of at least one of user input 220, configuration file 222, plain text file 224, table 226, geospatial data file 227, or some other type of data structure. In some cases, input data 214 may be received in the form of a geospatial data file.

Texture manager 120 uses set of values 216 for set of attributes 218 to identify number of texture decks 228. In particular, texture manager 120 may match set of values 216 for set of attributes 218 to number of texture decks 228 in plurality of texture decks 202 based on the set of assigned attributes for each of plurality of texture decks 202 and the set of assigned values for each assigned attribute in each set of assigned attributes. In this manner, each texture deck in number of texture decks 228 identified may be associated with attributes to which set of values 216 have been assigned.

Further, when a user wants to use textures that simulate what an image generated by an actual sensor device or sensor system would look like, the user may include the attribute of sensor type in set of attributes 218 and a value for that particular sensor type as a value in set of values 216 for that attribute. For example, when the user wants to use textures that simulate images generated by an infrared device, the user may include sensor type in set of attributes 218 and infrared in set of values 216. In this manner, any texture decks in plurality of texture decks 202 that have been assigned a value of "infrared" for the sensor type attribute may be included as a potential candidate for number of texture decks 228.

Texture manager 120 may be configured to select a texture deck from number of texture decks 228 as final texture deck 230 for use in forming model 114 for structure 116 in FIG. 1. Final texture deck 230 may be selected at least one of randomly or based on policy 232.

Further, texture manager 120 may select a texture from final texture deck 230 for each segment for each of number of sides 136 of geometric shape 132 identified for use in forming model 114 of structure 116 in FIG. 1. For example, texture manager 120 may select a final texture in final texture deck 230 for each segment in number of segments 142 in FIG. 1. Each final texture may be selected at least one of randomly or based on policy 232. Of course, a particular texture in final texture deck 230 may be selected multiple times for multiple segments.

In one illustrative example, policy 232 may indicate a number of rules for rules for selecting the final texture from final texture deck 230 for each of number of segments 142 in FIG. 1. These rules may take different forms. As one illustrative example, a rule in policy 232 may indicate that a texture having a feature that is a door may only be used for a segment representing the ground level or ground floor of a structure. In another illustrative example, a rule in policy 232 may indicate that for any segment located along the edge of a side and having a smaller size than the texture, only a texture having no features and only a background may be used.

All of the textures selected for the different segments for the different sides of geometric shape 132 in FIG. 1 may form final textures 231. Texture manager 120 may include an identification of each of final textures 231 in texture information 144 and then send texture information 144 to model manager 118.

Depending on the implementation, final texture deck 230 may be used to texturize each of number of geometric shapes 130 in FIG. 1. In some cases, different texture decks may be selected as the final texture decks for different geometric shapes in number of geometric shapes 130.

In this manner, visual simulation system 102 in FIG. 1 and texture manager 120 and texture library 122 described in FIGS. 1-2 may be used to automate the process of visually simulating three-dimensional environments, such as geographic areas, such that the time needed to complete this process may be reduced as compared to using some currently available visual simulation systems. In one illustrative example, three-dimensional environment 106 may be a portion of a city in which number of structures 112 in this portion of the city includes over 500 structures. A single human operator may use visual simulation system 102 to visually simulate this portion of the city with the over 500 structures based on two-dimensional geospatial data 124 in two to three hours.

The speed at which visual simulation system 102 allows geospatial simulations of areas to be generated may allow visual simulation system 102 to be used in performing operations such as mission planning operations and training operations. For example, visual simulations may be useful when planning for a mission that is to take place within a particular geographic area. The mission may include, for example, without limitation, flying through, delivering supplies to, performing surveillance of, extracting personnel from, and/or performing other types of operations within the geographic area.

However, the geographic area may be an area that is not well known or an area for which adequate intelligence or imagery has not been collected. For example, in some cases, only satellite imagery of the geographic area may be available. The satellite imagery may include long-distance images that are either low resolution or high resolution, depending on the implementation.

Visual simulation system 102 allows the geographic area to be visually simulated based on two-dimensional geospatial data that has been generated based on this satellite imagery. In particular, visual simulation system 102 may use texture library 122 to generate environment model 108 for the geographic area in which environment model 108 has a desired level of realism. For example, personnel may be able to use environment model 108 to become familiar with, or acclimatized to, the structures, features of structures, and textures of structures that they may encounter during the mission. The level of realism provided by environment model 108 may allow improved training of personnel before the mission.

Further, visual simulation system 102 may allow the geographic area to be visually simulated the same day that the mission is to be begun, even when number of structures 112 in the geographic area includes between 500 and 1,000 structures. In this manner, visual simulation system 102 may allow missions and advanced training for missions, which may not have been previously possible, to be performed.

The illustration of visual simulation system 102 in FIG. 1, texture manager 120 in FIGS. 1-2, and texture library 122 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although model manager 118 and texture manager 120 are described as being part of visual simulation system 102, these managers may be implemented in other types of systems. For example, model manager 118 and texture manager 120 may be implemented within a modeling system, a three-dimension rendering system, a virtual reality system, or some other type of visualization system. In this manner, model manager 118 and/or texture manager 120 may be configured for use with different types of visualization systems.

Further, plurality of texture decks 202 may be created using a common data format that may be supported by different types of visual simulation systems. In this manner, texture library 122 may be used with different types of visual simulation systems such that a model of a structure created using one type of visual simulation system may look the same as a model of the structure created using another type of visual simulation system.

Figure 3:
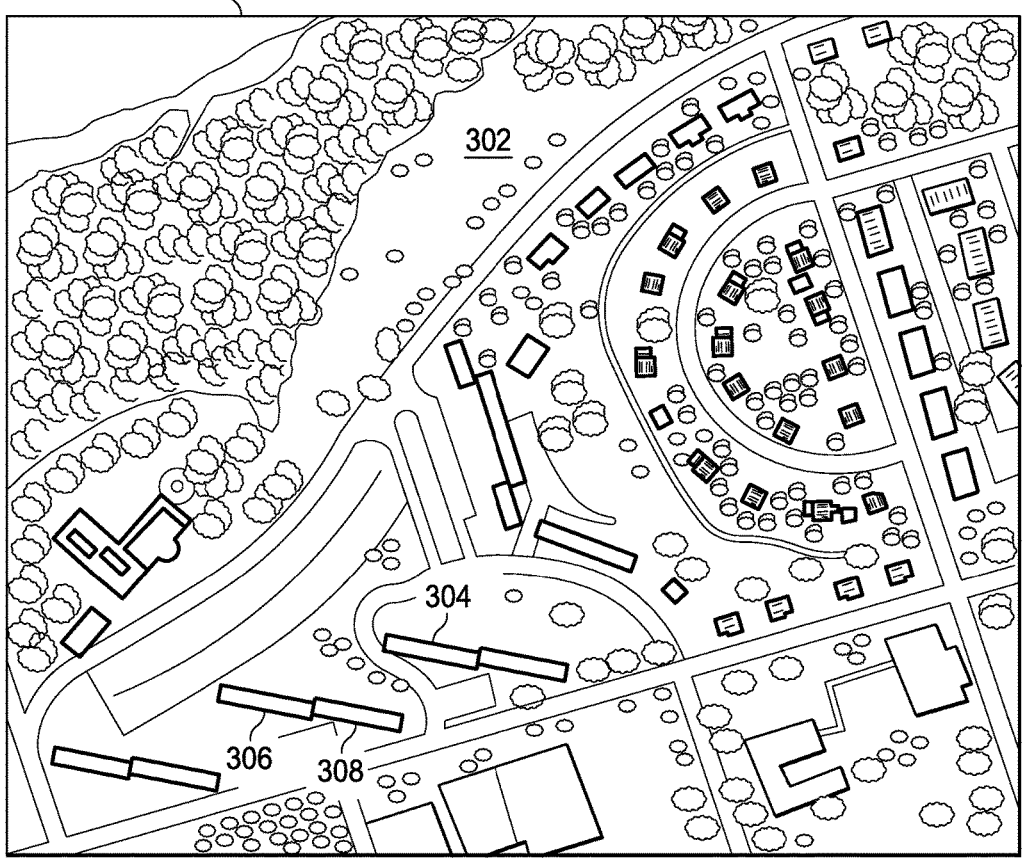
FIG. 3 is an illustration of two-dimensional geospatial data in accordance with an illustrative embodiment.

With reference now to FIG. 3, an illustration of two-dimensional geospatial data is depicted in accordance with an illustrative embodiment. In this illustrative example, two-dimensional geospatial data 300 is an example of one implementation for two-dimensional geospatial data 124 in FIG. 1. As depicted, two-dimensional geospatial data 124 takes the form of aerial image 302 having polygonal outlines 304.

Polygonal outlines 304 indicate the presence of buildings and the boundaries of those buildings. Rectangular outline 306 and rectangular outline 308 are examples of two of polygonal outlines 304 that indicate the boundaries of two buildings.

Aerial image 302 may be used by a model manager, such as model manager 118 in FIG. 1, to generate three-dimensional data, such as three-dimensional geospatial data 126 in FIG. 1. In particular, polygonal outlines 304 in aerial image 302 may be used by an extruder, such as extruder 128 in FIG. 1, to extrude geometric shapes for use in creating models of the buildings indicated by polygonal outlines 304.

Figure 4:
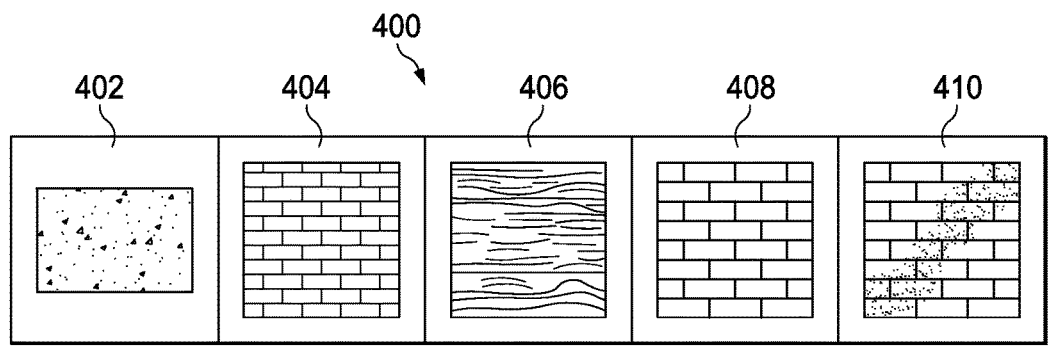
FIG. 4 is an illustration of textures in accordance with an illustrative embodiment.

With reference now to FIG. 4, an illustration of textures is depicted in accordance with an illustrative embodiment. In this illustrative example, textures 400 are examples of a portion of textures that may be included in textures 123 in texture library 122 in FIG. 2. In particular, each of textures 400 may be an example of one implementation for texture 200 in FIG. 2.

In this illustrative example, each of textures 400 has a background with no features. As depicted, textures 400 include concrete texture 402, light brick texture 404, stone texture 406, painted brick texture 408, and dark brick texture 410. Concrete texture 402 has a concrete background with no additional features. Light brick texture 404 has a light brick background with no additional features. Stone texture 406 has a stone background with no additional features. Painted brick texture 408 has a painted brick background with no additional features. Further, dark brick texture 410 has a dark brick background with no additional features.

Figure 5:
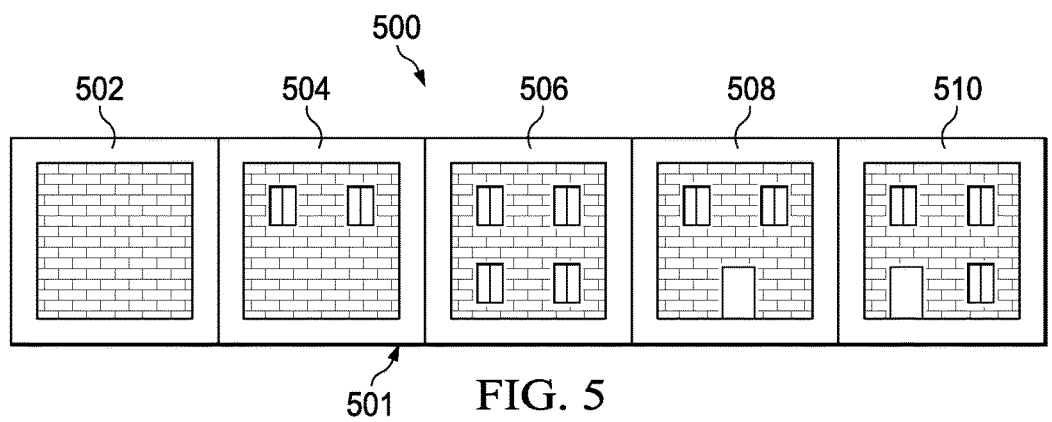
FIG. 5 is illustration of a texture deck in accordance with an illustrative embodiment.

With reference now to FIG. 5, an illustration of a texture deck is depicted in accordance with an illustrative embodiment. In this illustrative example, texture deck 500 is an example of one implementation for texture deck 204 in plurality of texture decks 202 in texture library 122 in FIG. 2. Texture deck 500 includes number of textures 501. Number of textures 501 may be an example of one implementation for number of textures 206 in FIG. 2.

Number of textures 501 includes first texture 502, second texture 504, third texture 506, fourth texture 508, and fifth texture 510. First texture 502, second texture 504, third texture 506, fourth texture 508, and fifth texture 510 all share the same background, which is a stone background, in this illustrative example. However, these textures have different features. For example, first texture 502 has the stone background with no features. Second texture 504 has the stone background with two upper windows. Third texture 506 has the stone background with four windows. Fourth texture 508 has the stone background with two upper windows and a door. Fifth texture 510 has a stone background with three windows and a door. Any one of these textures may be randomly selected for use in texturizing a segment of a side of a geometric shape in a model of a structure.

Figure 6:
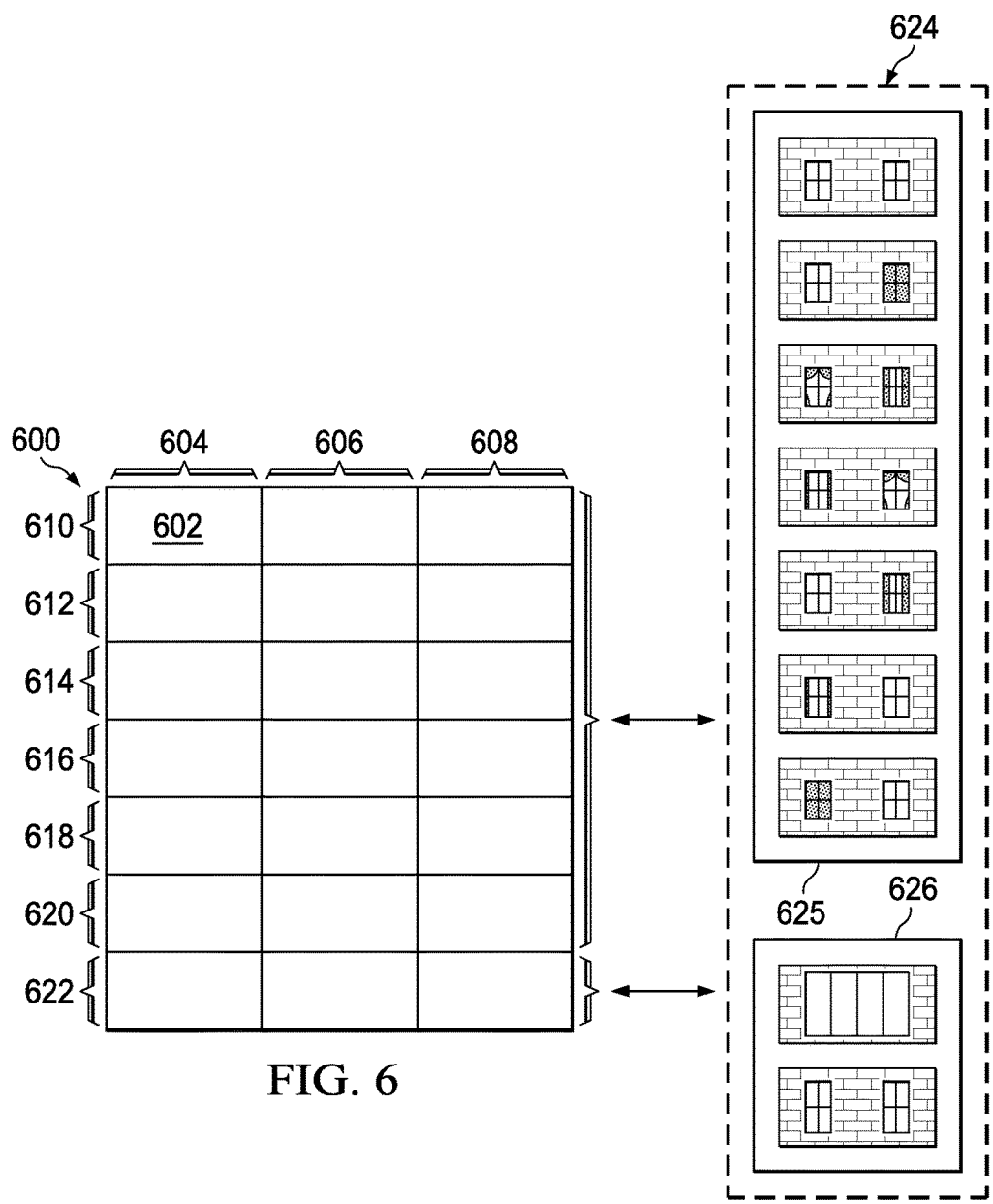
FIG. 6 is an illustration of a side of a geometric shape for a structure divided into segments in accordance with an illustrative embodiment.

With reference now to FIG. 6, an illustration of a side of a geometric shape for a structure divided into segments is depicted in accordance with an illustrative embodiment. As depicted, side 600 may be an example of one implementation for side 138 in FIG. 1. Side 600 is divided into segments 602. Segments 602 may be an example of one implementation for number of segments 142 in FIG. 1.

In this illustrative example, segments 602 have been arranged in rows and columns. In particular, segments 602 have been arranged in columns 604, 606, and 608 and rows 610, 612, 614, 616, 618, 620, and 622. For each segment at the intersection of a particular row and a particular column, a texture from texture deck 624 may be randomly selected and applied to that segment. However, a policy, such as policy 232 in FIG. 2, may be used to determine which texture is selected for which segment.

For example, the policy may include a rule indicating that only a texture from group of textures 625 in texture deck 624 may be used to texturize a segment in a row that is not the bottommost row. Further, the policy may also include a rule indicating that only a texture from group of textures 626 may be used to texture a segment in the bottommost row.

In this manner, only textures within group of textures 625 may be selected for the segments in rows 610, 612, 614, 616, 618, and 620. Further, only textures within group of textures 626 may be selected for the segments in row 622, which is the bottommost row. These types of rules may increase the realism of the model to be formed.

Figure 7:
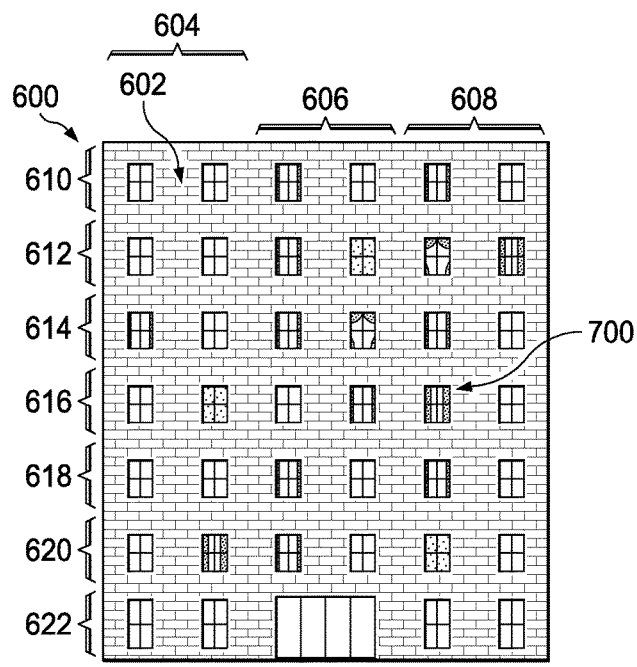
FIG. 7 is an illustration of a texturized side in accordance with an illustrative embodiment.

With reference now to FIG. 7, an illustration of a texturized side is depicted in accordance with an illustrative embodiment. In this illustrative example, side 600 from FIG. 6 has been texturized using final textures 700. In particular, final textures 700 have been applied to segments 602.

Figure 8:
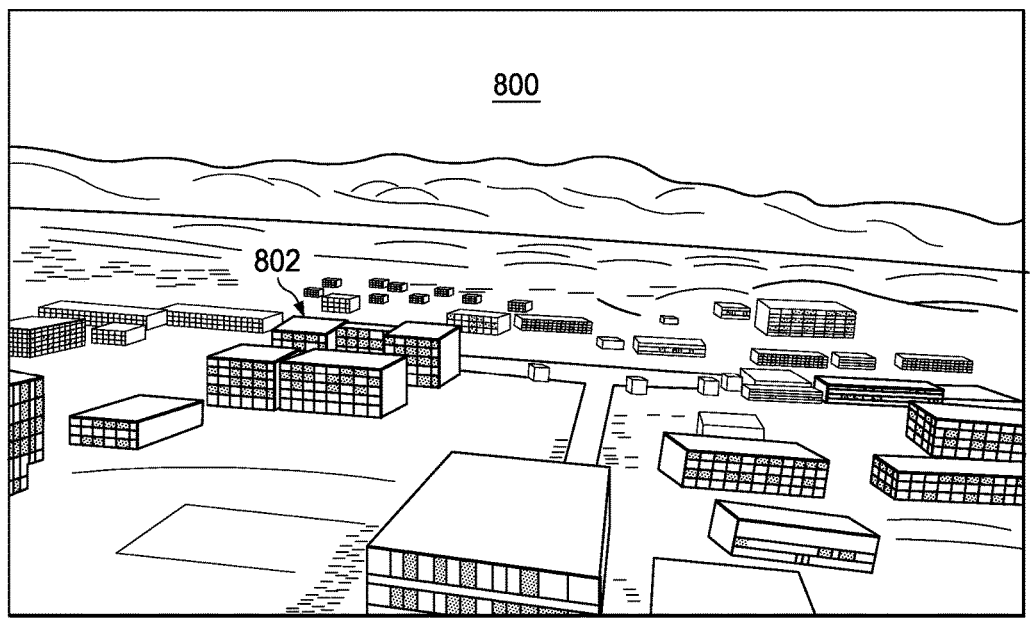
FIG. 8 is an illustration of an environment model of a three-dimensional environment in accordance with an illustrative embodiment.

With reference now to FIG. 8, an illustration of an environment model of a three-dimensional environment is depicted in accordance with an illustrative embodiment. In this illustrative example, environment model 800 is an example of one implementation for environment model 108 in FIG. 1. As depicted, environment model 800 may be comprised of models 802 of structures as well as other types of models. Models 802 may be formed using the process described in FIGS. 9-12 below.

Figure 9:
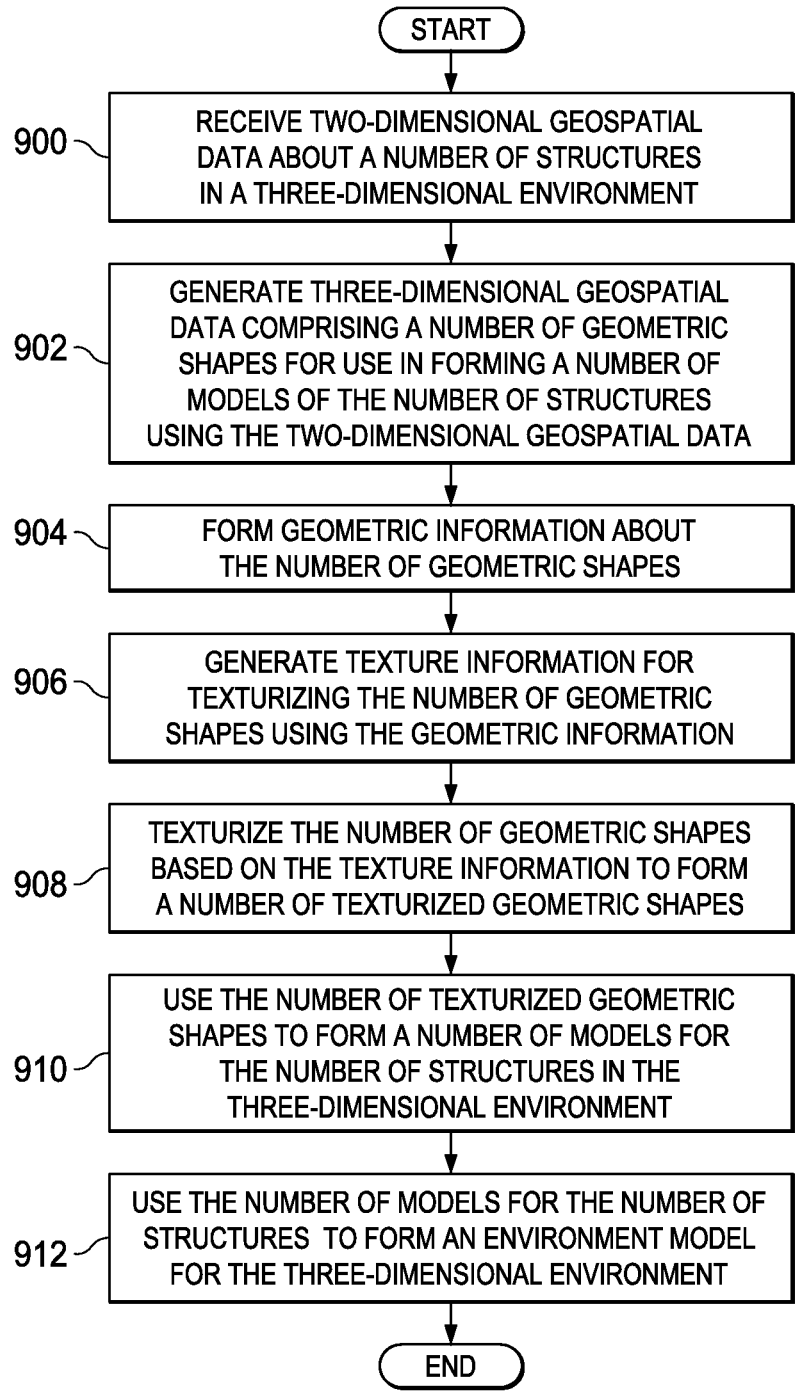
FIG. 9 is an illustration of a process for forming an environment model of a three-dimensional environment in the form of a flowchart in accordance with an illustrative embodiment.

With reference now to FIG. 9, an illustration of a process for forming an environment model of a three-dimensional environment is depicted in the form of a flowchart in accordance with an illustrative embodiment. The process illustrated in FIG. 9 may be implemented using visual simulation system 102 described in FIG. 1. In particular, this process may be used to form an environment model, such as environment model 108 in FIG. 1, for a three-dimensional environment, such as three-dimensional environment 106 in FIG. 1.

The process may begin by receiving two-dimensional geospatial data about a number of structures in a three-dimensional environment (operation 900). Three-dimensional geospatial data comprising a number of geometric shapes for use in forming a number of models of the number of structures is then generated using the two-dimensional geospatial data (operation 902).

Next, geometric information about the number of geometric shapes is formed (operation 904). This geometric information may include, for example, without limitation, an identification of a number of sides of each of the number of geometric shapes to be texturized. Further, the geometric information may identify a number of segments for each of the number of sides.

Texture information for texturizing the number of geometric shapes may then be generated using the geometric information (operation 906). Next, the number of geometric shapes may be texturized based on the texture information to form a number of texturized geometric shapes (operation 908). The number of texturized geometric shapes may then be used to form a number of models for the number of structures in the three-dimensional environment (operation 910). Thereafter, the number of models for the number of structures may be used to form the environment model for the three-dimensional environment (operation 912), with the process terminating thereafter.

Figure 10:
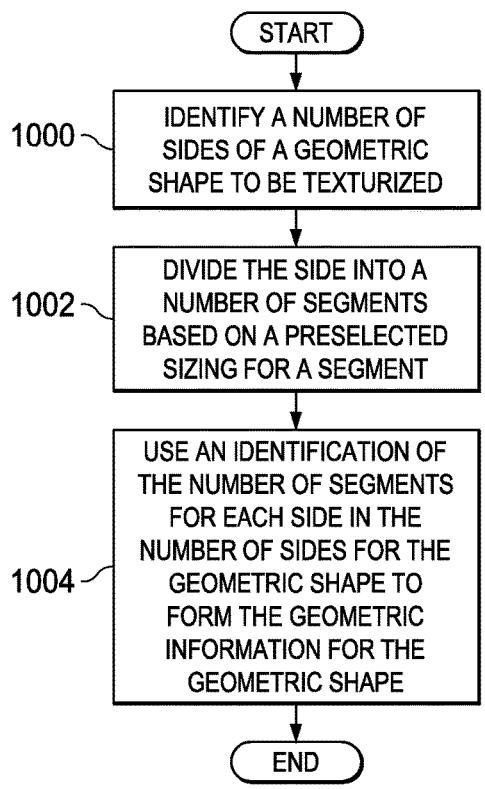
FIG. 10 is an illustration of a process for generating geometric information in the form of a flowchart in accordance with an illustrative embodiment.

With reference now to FIG. 10, an illustration of a process for generating geometric information is depicted in the form of a flowchart in accordance with an illustrative embodiment. The process illustrated in FIG. 10 may be performed by, for example, without limitation, a model manager, such as model manager 118 in FIG. 1. Further, this process may be used to implement operation 904 in FIG. 9. In particular, this process may be used to generate the geometric information corresponding to a particular geometric shape in the number of geometric shapes described in operation 904 in FIG. 9.

The process may begin by identifying a number of sides of a geometric shape to be texturized (operation 1000). Next, the side is divided into a number of segments based on a preselected sizing for a segment (operation 1002). An identification of the number of segments for each side in the number of sides for the geometric shape may be used to form the geometric information for the geometric shape (operation 1004), with the process terminating thereafter. The model manager may then send this geometric information to a texture manager, such as texture manager 120 in FIG. 1.

Figure 11:
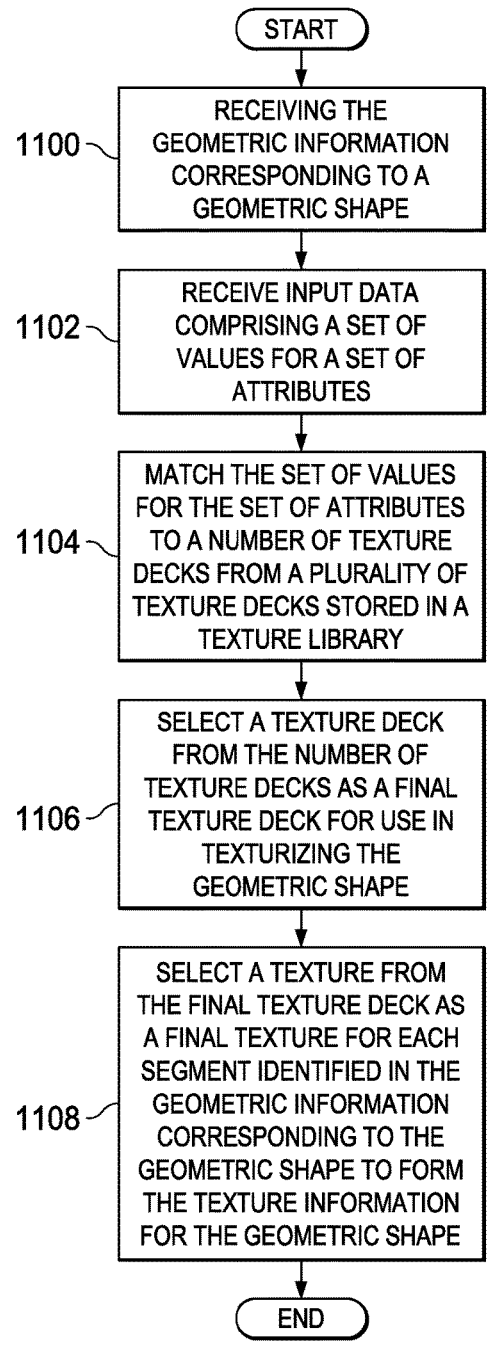
FIG. 11 is an illustration of a process for generating texture information in the form of a flowchart in accordance with an illustrative embodiment.

With reference now to FIG. 11, an illustration of a process for generating texture information is depicted in the form of a flowchart in accordance with an illustrative embodiment. The process illustrated in FIG. 11 may be performed by, for example, without limitation, a texture manager, such as texture manager 120 in FIG. 1. Further, this process may be used to implement operation 906 in FIG. 9. In particular, this process may be used to generate the texture information for texturizing a particular geometric shape in the number of geometric shapes described in operation 904 in FIG. 9.

The process may begin by receiving the geometric information corresponding to a geometric shape (operation 1100). Input data comprising a set of values for a set of attributes is also received (operation 1102). In operation 1102, the input data may be received in the form of user input, a configuration file, a geospatial data file, a table, or in some other type of input data.

Thereafter, the set of values for the set of attributes are matched to a number of texture decks from a plurality of texture decks stored in a texture library (operation 1104). A texture deck is selected from the number of texture decks as a final texture deck for use in texturizing the geometric shape (operation 1106). In operation 1106, the selection of the final texture deck may be performed at least one of randomly or based on a policy.

Next, a texture from the final texture deck may be selected as a final texture for each segment identified in the geometric information corresponding to the geometric shape to form the texture information for the geometric shape (operation 1108), with the process terminating thereafter. In operation 1108, the selection of a texture as the final texture for a particular segment may be performed at least one of randomly or based on a policy. Further, in operation 1108, a texture in the final texture deck may be selected multiple times to be the final texture for multiple segments.

Figure 12:
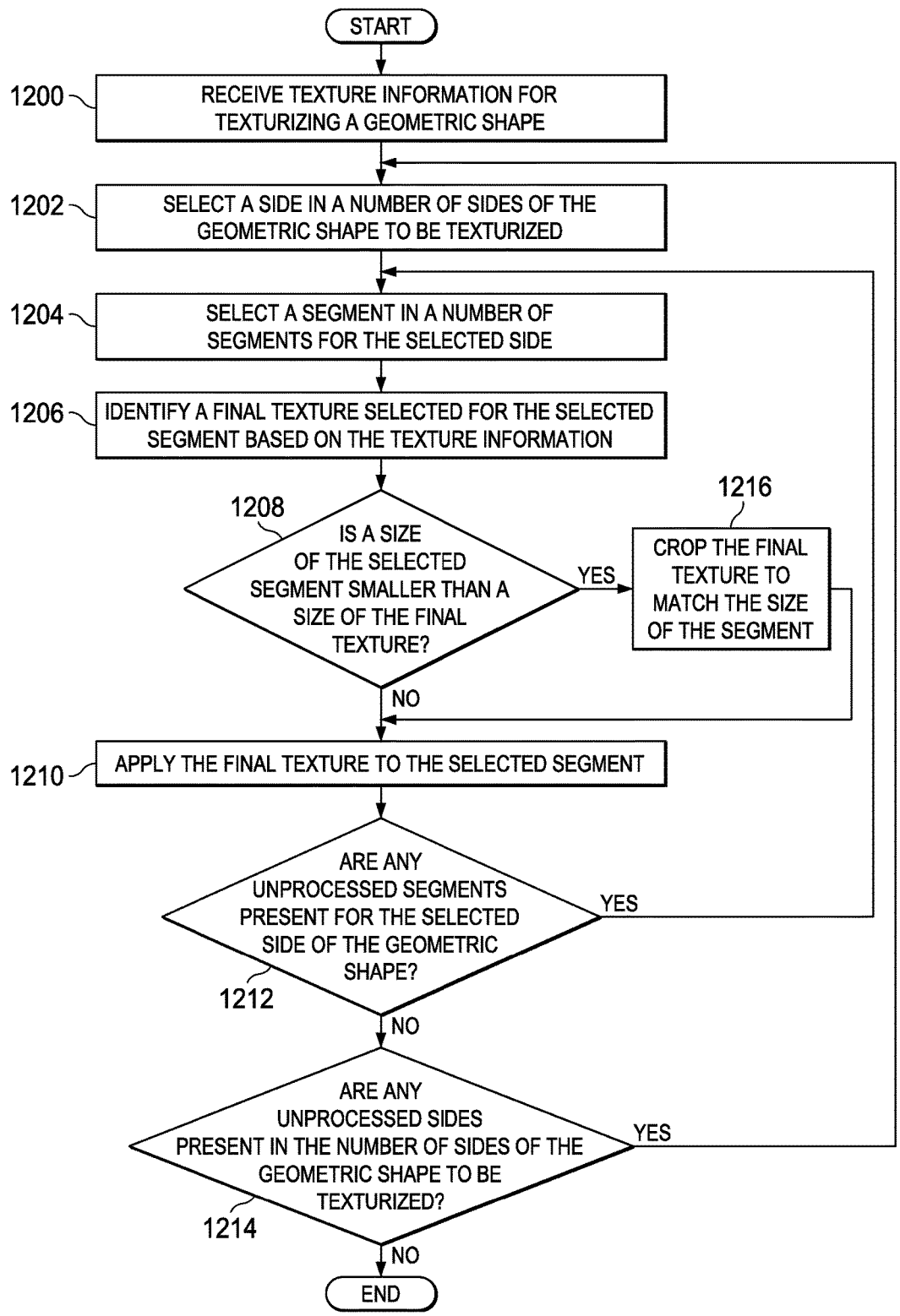
FIG. 12 is an illustration of a process for texturizing a geometric shape in the form of a flowchart in accordance with an illustrative embodiment.

With reference now to FIG. 12, an illustration of a process for texturizing a geometric shape is depicted in the form of a flowchart in accordance with an illustrative embodiment. The process illustrated in FIG. 12 may be performed by, for example, without limitation, a model manager, such as model manager 118 in FIG. 1. Further, this process may be used to implement operation 908 in FIG. 9. In particular, this process may be used to texturize one of the number of geometric shapes described in operation 908 in FIG. 9.

The process may begin by receiving texture information for texturizing a geometric shape (operation 1200). Next, a side in a number of sides of the geometric shape to be texturized is selected (operation 1202). Then, a segment in a number of segments is selected for the selected side (operation 1204). A final texture selected for the selected segment is identified based on the texture information (operation 1206).

Thereafter, a determination is made as to whether a size of the selected segment is smaller than a size of the final texture (operation 1208). If the size of the selected segment is not smaller than the size of the final texture, the final texture is applied to the selected segment (operation 1210).

Next, a determination is made as to whether any unprocessed segments are present for the selected side of the geometric shape (operation 1212). If any unprocessed segments are present for the selected side, the process returns to operation 1204 as described above. Otherwise, a determination is made as to whether any unprocessed sides are present in the number of sides of the geometric shape to be texturized (operation 1214). If any unprocessed sides are present, the process returns to operation 1202 as described above. Otherwise, the process terminates.

With reference again to operation 1208, if the size of the selected segment is smaller than the size of the final texture, the final texture is cropped to match the size of the segment (operation 1216). Thereafter, the process proceeds to operation 1210 as described above.

In this manner, the processes described in FIGS. 9-12 may be used to increase the efficiency with which models of structures and models of three-dimensional environments are created. In particular, the texture library, texture manager, and the model manager provided by the illustrative embodiments may be used to automatically process large numbers of two-dimensional geospatial vector features to create texturized models of structures more quickly and efficiently than is currently possible manually.

Further, by using input data to select the final texture deck that is used for creating the model of a structure, the user may be given a desired amount of control over which textures are applied to the geometric shapes for certain models and how the textures are applied. The input data may be used to increase the realism of the models of structures created.

Turning now to FIG. 13, an illustration of a data processing system in the form of a block diagram is depicted in accordance with an illustrative embodiment. Data processing system 1300 may be used to implement at least one of three-dimensional visualization system 100, visual simulation system 102, model manager 118, or texture manager 120 in FIG. 1. In particular, data processing system 1300 may be used to implement model manager 118 and/or texture manager 120 in visual simulation system 102. As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise a number of processors, a multiprocessor core, and/or some other type of processor, depending on the implementation. In some cases, processor unit 1304 may take the form of a hardware unit, such as a circuit system, an application specific integrated circuit (ASIC), a programmable logic device, or some other suitable type of hardware unit.

Instructions for the operating system, applications, and/or programs run by processor unit 1304 may be located in storage devices 1306. Storage devices 1306 may be in communication with processor unit 1304 through communications framework 1302. As used herein, a storage device, also referred to as a computer readable storage device, is any piece of hardware capable of storing information on a temporary and/or permanent basis. This information may include, but is not limited to, data, program code, and/or other information.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory, a rewritable optical disk, a rewritable magnetic tape, or some combination of the above. The media used by persistent storage 1316 may or may not be removable.

Communications unit 1308 allows data processing system 1300 to communicate with other data processing systems and/or devices. Communications unit 1308 may provide communications using physical and/or wireless communications links.

Input/output unit 1310 allows input to be received from and output to be sent to other devices connected to data processing system 1300. For example, input/output unit 1310 may allow user input to be received through a keyboard, a mouse, and/or some other type of input device. As another example, input/output unit 1310 may allow output to be sent to a printer connected to data processing system 1300.

Display 1312 is configured to display information to a user. Display 1312 may comprise, for example, without limitation, a monitor, a touch screen, a laser display, a holographic display, a virtual display device, and/or some other type of display device.

In this illustrative example, the processes of the different illustrative embodiments may be performed by processor unit 1304 using computer-implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal containing program code 1318. This data signal may be an electromagnetic signal, an optical signal, and/or some other type of signal that can be transmitted over physical and/or wireless communications links.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a processor;
   a texture library comprising a plurality of texture decks, wherein each texture deck in the plurality of texture decks includes a plurality of textures for a model of a structure that is indigenous to a geographic region, wherein the structure is selected from a building, a tower, a bridge, a dam, a lighthouse, a factory, a manufacturing plant, and a house;
   a texture manager that receives input data comprising a set of values for a set of attributes comprising attributes for the geographic region, matches the set of values for the set of attributes for the geographic region to a number of texture decks from the plurality of texture decks, based on the attributes for the geographic region selects a texture deck from the number of texture decks as a final texture deck for use in forming the model of the structure, and generates texture information for use in forming the model of the structure using the final texture deck by selecting a final texture from the final texture deck for each of a plurality of segments of a side of the model of the structure based on a policy that indicates a number of rules for selecting the final texture from the final texture deck for each of the plurality of segments, wherein the plurality of segments are arranged in rows, and wherein:
- a first rule of the number of rules in the policy indicates that a texture having a feature that is a door is only used for a segment representing a ground level or ground floor of the structure;
- a second rule of the number of rules in the policy indicates to use only a texture having no features and only a background for a segment located along an edge of a side and the segment having a smaller size than the texture having no features and only a background;
- a third rule of the number of rules in the policy indicates that only a texture from a first group of textures in the texture deck is used to texturize a segment in a row that is not a bottommost row; and
- a fourth rule of the number of rules in the policy indicates that only a texture from a second group of textures is used to texturize a segment in the bottommost row; and a model manager that identifies a geometric shape for use in forming the model of the structure and texturizes a number of sides of the geometric shape using the final texture selected from the final texture deck for each of the plurality of segments of the side of the model of the structure to form the model of the structure.

2. The apparatus of claim 1, wherein the texture manager receives geometric information corresponding to the geometric shape identified for use in forming the model of the structure and selects final textures from the final texture deck for use in texturizing the geometric shape based on the geometric information to form the texture information.

3. The apparatus of claim 2, wherein the geometric information identifies the number of sides of the geometric shape and a number of segments for each side in the number of sides to be texturized.

4. The apparatus of claim 1, wherein the input data is received in at least one of user input, a configuration file, a geospatial data file, and a table.

5. The apparatus of claim 1, wherein a texture deck in the plurality of texture decks is associated with a set of assigned attributes comprising attributes for the geographic region, a subregion, a structure type, a building material, an architectural feature, and a sensor type that are each associated with at least one assigned value.

6. The apparatus of claim 5, wherein values for region attributes of the geographic region include North America, North Africa, Sub-Sahara Africa, Asia, and Europe;
- wherein the subregion identifies a geographic subregion of the geographic region and values for subregion attributes include urban, rural, desert, and mountain;
- wherein values for structure type attributes include a building, a tower, a factory, a manufacturing plant, a residential dwelling, an apartment complex, and a commercial building;
- wherein values for sensor type attributes include an infrared sensor, an ultraviolet sensor, an electro-optical sensor, a radar system, a nighttime sensor, a classified sensor, a daytime sensor, and a thermal imaging device; and
- wherein a number of textures in the final texture deck all share a same background.

7. The apparatus of claim 1, wherein the final texture deck comprises:
- a number of textures, wherein a texture in the number of textures comprises at least one of a background and a number of features.

8. The apparatus of claim 7, wherein the background is selected from one of a brick background, a concrete background, a stone background, a slab background, a stucco background, a wood paneling background, a glass background, and a metal background and wherein the number of features is selected from one of a window, a door, a balcony, a railing, and an architectural feature.

9. The apparatus of claim 1, wherein the model manager and the texture manager are implemented within a three-dimensional visualization system.

10. The apparatus of claim 1, wherein the model of the structure is configured for use in forming an environment model of a three-dimensional environment.

11. A visual simulation system comprising:
- a processor;
- a texture library comprising a plurality of texture decks in which a texture deck in the plurality of texture decks is associated with a set of assigned attributes in which each assigned attribute in the set of assigned attributes is associated with at least one assigned value;
- a texture manager that receives input data comprising a set of values for a set of attributes, matches the set of values for the set of attributes to a number of texture decks from the plurality of texture decks, selects a texture deck from the number of texture decks as a final texture deck for use in forming a number of models of a number of structures, and generates texture information for use in forming the number of models of the number of structures using the final texture deck by selecting a final texture from the final texture deck for each of a plurality of segments of a number of sides of the number of models of the number of structures based on a policy that indicates a number of rules for selecting the final texture from the final texture deck for each of the plurality of segments, wherein the plurality of segments are arranged in rows, and wherein:
  - a first rule of the number of rules in the policy indicates that a texture having a feature that is a door is only used for a segment representing a ground level or ground floor of the structure;
  - a second rule of the number of rules in the policy indicates to use only a texture having no features and only a background for a segment located along an edge of a side and the segment having a smaller size than the texture having no features and only a background;
  - a third rule of the number of rules in the policy indicates that only a texture from a first group of textures in the texture deck is used to texturize a segment in a row that is not a bottommost row, and
  - a fourth rule of the number of rules in the policy indicates that only a texture from a second group of textures is used to texturize a segment in the bottommost row; and a model manager that identifies a geometric shape for use in forming a model of a structure and texturizes each of a number of sides of the geometric shape using the final texture selected from the final texture deck for each of the plurality of segments of the number of sides of the number of models of the number of structures to form the model of the structure wherein the structure is selected from a building, a tower, a bridge, a dam, a lighthouse, a factory, a manufacturing plant, and a house.

12. A computer-implemented method for forming a model of a structure, the method comprising:

receiving input data comprising a set of values for a set of attributes;

matching the set of values for the set of attributes to a number of texture decks in a plurality of texture decks, wherein a texture deck in the plurality of texture decks is associated with a set of assigned attributes in which each assigned attribute in the set of assigned attributes is assigned at least one assigned value;

selecting a texture deck from the number of texture decks as a final texture deck for use in forming the model of the structure;

generating texture information for use in forming the model of the structure using the final texture deck by selecting a final texture from the final texture deck for each of a plurality of segments of a side of the model of the structure based on a policy that indicates a number of rules for selecting the final texture from the final texture deck for each of the plurality of segments, wherein the plurality of segments are arranged in rows, and wherein:

a first rule of the number of rules in the policy indicates that a texture having a feature that is a door is only used for a segment representing a ground level or ground floor of the structure, a second rule of the number of rules in the policy indicates to use only a texture having no features and only a background for a segment located along an edge of a side and the segment having a smaller size than the texture having no features and only a background, a third rule of the number of rules in the policy indicates that only a texture from a first group of textures in the texture deck is used to texturize a segment in a row that is not a bottommost row, and a fourth rule of the number of rules in the policy indicates that only a texture from a second group of textures is used to texturize a segment in the bottommost row; and texturizing each of a number of sides of a geometric shape using the final texture selected from the final texture deck for each of the plurality of segments of the side of the model of the structure to form the model of the structure.

13. The computer-implemented method of claim 12 further comprising:

identifying the geometric shape for use in forming the model of the structure.

14. The computer-implemented method of claim 12, wherein generating the texture information comprises:

receiving geometric information corresponding to the geometric shape identified for use in forming the model of the structure; and selecting the final textures from the final texture deck for use in texturizing the geometric shape based on the geometric information to form the texture information.

15. The computer-implemented method of claim 14, wherein receiving the geometric information corresponding to the geometric shape comprises:

receiving the geometric information for the geometric shape, wherein the geometric information identifies a number of sides of the geometric shape and a number of segments for each side in the number of sides to be texturized.

16. The apparatus of claim 1, wherein the texture manager further selects the same final texture from the final texture deck multiple times to be the final texture for multiple segments of the side of the model of the structure.

17. The visual simulation system of claim 11, wherein the texture manager further selects the same final texture from the final texture deck multiple times to be the final texture for multiple segments of the number of sides of the number of models of the number of structures.

18. The computer-implemented method of claim 12 further comprising selecting the same final texture from the final texture deck multiple times to be the final texture for multiple segments of the side of the model of the structure.

19. The apparatus of claim 1, wherein the texture manager randomly selects the final texture for each segment of the plurality of segments from a group of textures in the final texture deck, wherein the group of textures is selected based on which row each segment is in.

* * * * *